United States Patent Office 2,887,371
Patented May 19, 1959

2,887,371

METHOD OF KILLING UNDESIRED PLANTS

George E. Bennett and William W. Lee, Dayton, Ohio, assignors to Monsanto Chemical Company, St. Louis, Mo., a corporation of Delaware No Drawing. Application January 26, 1954
Serial No. 406,344

3 Claims. (Cl. 71—2.3)

This invention in one aspect relates to herbicides. In another aspect, this invention relates to a new field of chemistry involving the production of acetylenic silanes having all four valences of a silicon atom directly bonded to carbon, at least one of said carbons being an acetylenic carbon and further characterized in that the other carbon atom associated with the acetylenic triple bond contains an active hydrogen atom. The invention in its various aspects relates to such compounds per se, to methods for producing same, to amines prepared therefrom, to Grignard reagents prepared therefrom, to alkali metal compounds prepared therefrom, to alcohols prepared therefrom via said Grignard or alkali metal compounds, and to acids derived therefrom via said Grignard or alkali metal compounds, including esters and salts of said acids, and to use of all of the foregoing as herbicides. In other aspects the invention provides new herbicides and general biological toxicants.

Various compounds have been provided in the past that contain a silicon atom bonded to an acetylenic carbon. However, if the other valences of the silicon atom were bonded directly to carbon, no active acetylenic hydrogen was present in the molecule. On the other hand, any such compounds formed that contained an active hydrogen on the acetylenic portion of the molecule required that at least some of the silicon valencies other than those associated with the acetylene group be bonded to oxygen thereby constituting siliconic acid derivatives. As a result of the limitations of the prior chemistry, further reactions of the compounds thus provided were definitely limited.

We have discovered a large group of related compounds that are useful as herbicides. In accordance with preferred embodiments of the present invention, silyl acetylenes are provided having the formula $R_nSi(C\equiv CH)_{4-n}$ wherein R is a hydrocarbon radical and $n$ is an integer from zero (0) to three (3) inclusive. Preferred compounds are trialkyl and triaryl silyl acetylenes, corresponding to the above formula where R is alkyl or aryl and $n$ is three (3). Such compounds are more formally designated ethynyltrialkylsilanes and ethynyltriarylsilanes. However, also of considerable value because of their plurality of acetylenic groups containing an active hydrogen and attached to a silicon atom whose other valences are attached directly to carbon, are the following groups of compounds:

$$R_2Si(C\equiv CH)_2$$
$$RSi(C\equiv CH)_3$$
$$Si(C\equiv CH)_4$$

wherein R is as defined above.

We have found that compounds of the type described in the preceding paragraph are readily obtained by the reaction of an alkali metal acetylide having the formula $MC\equiv CH$ wherein M is an alkali metal, especially sodium, potassium, or lithium, with halosilanes of the general formula $R_nSiX_{4-n}$ wherein $n$ is an integer from zero (0) to three (3), i.e., is 0, 1, 2, or 3, R is a hydrocarbon radical, and X is halogen, i.e., chlorine, bromine, iodine, or fluorine; an exception to these reactants are the compounds $R_3SiF$ whose fluorine atom is non-reactive. The reaction is expressed by the equation:

$$R_nSiX_{4-n} + (4-n)MC\equiv CH \rightarrow R_nSi(C\equiv CH)_{4-n} + (4-n)MX$$

where R is a hydrocarbon radical, M is an alkali metal, $n$ is an integer from 0 to 3 inclusive, and X is halogen (but not F when $n$ is 3).

The reaction is conveniently effected at temperatures in the neighborhood of room temperature, i.e., in the neighborhood of 20° C. In most instances the temperature need not exceed 50° C. Temperatures as low as 0° C. and below can be used if desired.

The reaction is most conveniently effected in the presence of a liquid polar organic solvent, especially oxygenated solvents such as N-methylmorpholine, dibutyl Cellosolve (dibutyl ether of ethylene glycol), diethyl Cellosolve (diethyl ether of ethylene glycol), dioxane, tetrahydrofuran, tetrahydropyran, or tertiary amines, for example pyridine. Compounds containing free hydroxy groups, primary or secondary amine groups, and other such reactive groups should be avoided. The requirements of a suitable solvent are that it be a non-hydrocarbon organic liquid, that it be non-reactive with alkali metal acetylide and non-reactive with the halosilane, and that it exhibit sufficient solubility for the alkali metal acetylide to permit the reaction to proceed.

The reaction mixture should be maintained anhydrous. Approximately stoichiometric proportions of the reactants are most conveniently used, although an excess of either is permissible. Use of less than the stoichiometric quantity of alkali metal acetylide will result in a more complex reaction mixture and for this reason it is usually preferred to employ at least the stoichiometric quantity of the alkali metal acetylide. The reaction can be effected either batchwise or continuously by known techniques. The time required for the reaction will naturally be somewhat dependent upon whether a batch or continuous reaction system is utilized. For a batch reaction, a reaction time of from 1 to 10 hours is usually adequate. In a continuous reaction system the rate of heat removal is a limiting factor. The reaction is conveniently effected batchwise by gradual addition of one reactant to a solution of the other reactant in the solvent. While the reaction can be effected under some pressure, it is preferred not to be too high when working with acetylenic compounds such as alkali metal acetylides and therefore atmospheric pressure and temperatures not in excess of the boiling point of the product or the lowest boiling component of the reaction mixture are preferred. The products of the invention are reasonably stable at the usual reaction conditions, but it is preferred to avoid heating the reaction mixture any longer than necessary for completing the reaction; this is particularly true in the case of the aryl compounds.

The R group in the structural formulae given hereinabove can be any hydrocarbon radical. While there is no particular upper limit on the size of such radicals, ordinarily those containing up to 18 or 20 carbon atoms are preferred. It is to be understood that the starting halosilane can contain different R groups, and/or different halogen atoms, in the same molecule, although because of difficulties of preparation it is more customary to work with halosilane in which all the R groups, and all the halogen atoms, in the molecule are the same. It is also to be understood that a mixture of different halosilanes can be present in a single reaction mixture in which reaction is being effected with alkali metal acetylide, and that as a result mixed products can be obtained. The lower alkyl groups, say containing from 1 to 6 carbon atoms, and the lower aryl groups, such as phenyl and alkylphenyls wherein the alkyl groups do not total over 3 or 4 carbon atoms, are preferred reactants. R can be alkyl, alkenyl, alkynyl, cyclo-aliphatic such as cycloalkyl and cycloalkenyl, aryl, and mixed radicals that contain two or more of the types just described, such for example as aralkyl, alkaryl, alkylcycloalkyl, cycloalkylaryl, and the like which ordinarily are classified as alkyl, alkenyl, cycloaliphatic, aryl, or similar general designation in accordance with the character of that portion of the radical which is attached to the silicon atom. By way of example, but not limitation, of suitable hydrocarbon radicals, any of which can be present in a molecule of the type $R_nSiX_{4-n}$ wherein X is any of the halogens chlorine, bromine, fluorine or iodine, (except $R_3SiF$ where F is unreactive), can be mentioned: methyl, ethyl, n-propyl, isopropyl, n-butyl, isobutyl, tert.-butyl, dodecyl, vinyl, propenyl, ethynyl, butynyl, cyclohexenyl, methylcyclohexenyl, methylcyclopentyl, phenyl, biphenyl, tolyl, naphthyl, dimethylnaphthyl, benzyl, p - phenylbenzyl. Among suitable reactants can be particularly named, by way of example but not limitation:

$(CH_3)_3SiCl$
$(CH_3)_2SiCl_2$
$(C_6H_5)_3SiCl$
$(CH_3C_6H_4)_2SiBr_2$
$HC{\equiv}C-Si-Br_3$
$H_2C{=}CHSiCl_3$
$(Cyclohexyl{-})_3SiI$
$C_3H_7SiF_3$
$(CH_3OC_6H_4)_2SiBrCl$
$(CH_3)(C_2H_5)_2SiCl$
$(C_6H_5CH_2)_3SiBr$
$(ClC_6H_4)_3SiCl$ It will be understood that each of the compounds named is converted, in accordance with the invention, to the corresponding compound wherein the halogen atom or atoms are replaced by ethynyl groups. The term "hydrocarbon radical" is used throughout this patent application in its broader sense, in that a particular R group can also contain constituents other than carbon and hydrogen, for example alkoxy, nitro, chloro, etc., which are non-reactive or at least which do not interfere with the desired reaction or use of a compound containing same at the conditions employed. Such non-interfering radical will often actually enhance the properties of a compound desired for a given use. One skilled in the art will recognize that a compound containing a hydrocarbon radical that is substituted with a non-interfering group is the equivalent of the corresponding compound containing a hydrocarbon radical containing only carbon and hydrogen. Such non-interfering group can be initially present in a compound subjected to one of the reactions of this invention and can, depending on the circumstances, either be retained in the product molecule or be destroyed or changed during the reaction; or such group can be introduced by known means into one of the new compounds of this invention subsequent to formation of such compound. One of the most important utilities lies in the fact that a silicon atom completely bonded to carbon is provided wherein at least one of the carbons is an acetylenic carbon and wherein the molecule contains at least one active hydrogen as part of the acetylenic group. This active hydrogen is thus available for a variety of further chemical reactions for introducing the $R_nSi(C{\equiv}C-)_{4-n}$ grouping into molecules.

All of the compounds already described hereinabove, and all of the compounds yet to be described hereinbelow, find use as biological toxicants, and are especially valued as herbicides. Procedures for employing same as herbicides are given hereinafter in detail.

Another aspect of our invention provides new amines, and salts thereof, made by application of the Mannich reaction to any of the silyl acetylenes described herein above. The Mannich reaction is discussed in detail by F. F. Blicke in "Organic Reactions," edited by Roger Adams et al., volume 1, pages 303–341, John Wiley & Sons, Inc., 1942, to which reference is hereby made. In the case of the present invention, the reaction can be exemplified by the following equation:

$$R_nSi(C{\equiv}CH)_{4-n}+(4-n)CH_2O+(4-n)HNR'R''$$
$$\rightarrow R_nSi(C{\equiv}CCH_2NR'R'')_{4-n}+(4-n)H_2O$$

where n is an integer from 0 to 3 inclusive and where each of R' and R'' is a hydrocarbon radical. The discussion of R given hereinabove is applicable to each of R' and R''. Further, R' and R'' can together form a ring, as in the case where HNRR' is piperidine. If desired, primary amines, e.g., $R'NH_2$, can be substituted for secondary amines in this reaction, giving secondary amine products instead of tertiary amine products. This aspect of the invention therefore provides new secondary and tertiary amines having the formulae $$R_nSi(C{\equiv}CCH_2NHR')_{4-n} \qquad (a)$$

and $$R_{nn}Si(C{\equiv}CCH_2NR'R'')_{4-n} \qquad (b)$$

Ordinarily, where a primary amine reactant is used, the reaction does not stop with the secondary amine (a) but continues with addition of another molecule of the starting silyl acetylene and formaldehyde, giving, e.g., in the case of the tri-substituted silyl acetylene, $$R_3SiC{\equiv}CCH_2NR'CH_2C{\equiv}CSiR_3$$

By reaction of the various amine products with inorganic acids (e.g. HCl, $H_2SO_4$, $HNO_3$) or organic acids (e.g. acetic, benzoic), or with organic quaternizing agents such as organic halides (e.g. methyl bromide), sulfonates (e.g. para-toluenesulfonic acid), etc., the corresponding salts or quaternized amines are provided.

By way of example, ethynyltrimethylsilane is reacted with formaldehyde and diethylamine to produce 3-diethylamino - 1 - trimethylsilylpropyne. The hydrochloride is readily made by reacting the latter compound with anhydrous or aqueous HCl.

Formaldehyde is essential to the Mannich reaction in the classical sense, but other aldehydes, e.g., acetaldehyde, benzaldehyde, etc., can be substituted and the analogous products obtained.

Reaction solvents and conditions commonly used in the Mannich reaction, and which are described in detail in the article by Blicke referred to above, are likewise suitable in carrying out the formation of the Mannich bases of the present invention. For example, refluxing equimolar quantities of the reactants in dioxane, ethanol, or other alcohol is suitable.

Merely as examples of the numerous amines that can be used as reactants, are methylamine, N-methylethylamine, di-t-butylamine, piperidine, dicyclohexylamine, N - methylbenzylamine, hexamethylenediamine (both groups undergo the Mannich reaction), etc.

The Mannich bases of this invention are herbicides. They are useful chemical intermediates in that they contain a reactive amine group, as well as a silicon atom bound solely to carbon and adjacent to one or more carbon-carbon triple bonds. The salts are water-soluble, and stable in water solution.

Another aspect of our invention provides new Grignard reagents, made from any of the silyl acetylenes described hereinabove. The Grignard reagents are best obtained by reacting the silyl acetylenes with an alkyl magnesium halide Grignard, e.g., ethyl magnesium bromide, in diethyl ether solution, resulting in the formation of the new Grignards corresponding to the general formula $R_nSi(C{\equiv}CMgX)_{4-n}$ wherein R is a hydrocarbon radical as described hereinbefore, X is a Grignard halogen, ordinarily bromine, iodine, or chlorine, and n is an integer from 0 to 3 inclusive. To prepare an initial alkyl magnesium halide, generally to magnesium metal in ether (or other solvent) is added an alkyl halide at such rate that exothermic reaction will maintain gentle refluxing. Use of lower temperatures increases the reaction time but also advantageously increases the yield of the alkyl magnesium halide Grignard at the expense of by-product hydrocarbon formed by coupling. After all the alkyl halide is added, the reaction mixture is stirred and maintained at the chosen reaction temperature until all the magnesium is dissolved. If desired, the ether can be replaced by another solvent at this point. Thereafter, the chosen silylacetylene is added to the stirred Grignard reagent. The resulting mixture can be stirred at room temperature or reflux temperature until all the silylacetylene is converted to the corresponding Grignard. An alternative is to place the magnesium and silylacetylene in a suitable solvent, then add alkyl halide, stir, and reflux until all magnesium is dissolved and for a length of time thereafter to insure that all the silylacetylene is converted to its Grignard.

A preferred class of Grignard reagents are those having the formula $R_3SiC{\equiv}CMgX$ wherein R is a hydrocarbon radical as aforesaid and X is a Grignard halogen. By way of example but not limitation, the following Grignard reagents are mentioned specifically, it being remembered that the Grignard reagents of each of the silyl acetylenic compounds described hereinbefore in this application are contemplated by the invention:

$(CH_3)_3Si{\equiv}CMgBr$

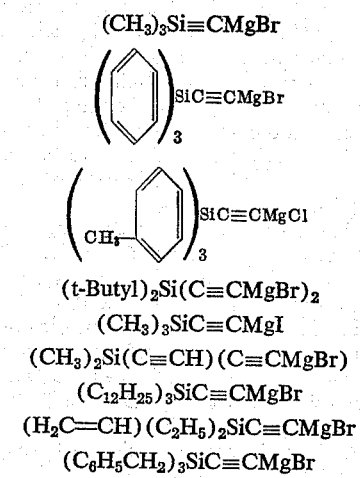

$(t\text{-Butyl})_2Si(C{\equiv}CMgBr)_2$ $(CH_3)_3SiC{\equiv}CMgI$ $(CH_3)_2Si(C{\equiv}CH)(C{\equiv}CMgBr)$ $(C_{12}H_{25})_3SiC{\equiv}CMgBr$ $(H_2C{=}CH)(C_2H_5)_2SiC{\equiv}CMgBr$ $(C_6H_5CH_2)_3SiC{\equiv}CMgBr$ It will be noted that where a silyl acetylene of the type described herein contains more than one acetylenic group, a Grignard reagent can be made by use of less than the stoichiometric quantity of alkyl magnesium halide whereby there is formed a mixture of compounds including Grignard compounds still containing a —C≡CH group. In such case the —C≡CH group or groups can be considered to constitute one or more of the hydrocarbon radicals R in the general formula of the Grignard reagent.

The Grignard reagents described are used in the form customary for a Grignard reagent, i.e., in solution and/or suspension in diethyl ether or other ethers, e.g., dibutyl ether, tetrahydrofurane, the Cellosolves, or non-ethers such as benzene or toluene. The Grignard reagents are usually obtained as a suspension in which the solvent employed during the reaction forming the Grignard is probably chemically associated with the precipitated Grignard reagent. A mixture of ethers, for example diethyl Cellosolve and diethyl ether, can be used in preparing a Grignard. If desired, the silylacetylene can be prepared, and from it the Grignard reagent, in the original Cellosolve or other solvent without the extra step of isolating the pure silylacetylene. A Grignard reagent can be prepared in an ethyl solvent, and thereafter the ether replaced with a high-boiling solvent by distilling off the ether after the other solvent is added. These and other modifications for preparing the Grignard reagents in suitable forms for use as such or for use in further reactions will be understood by those skilled in the art, having had the benefit of the present disclosure. The usual precautions should be taken to avoid contact of the Grignard reagent with water and also to avoid its contact with air.

The Grignard compounds described herein are subject to various known reactions of Grignard reagents, and thus are of great utility. A great variety of organic compounds is directly derivable therefrom by the known Grignard reactions, whereby organic molecules are formed containing the silyl acetylene structures of the types described herein. Some specific examples of such reactions are tabulated below, wherein $R_3SiC{\equiv}CMgBr$ typifies the Grignard compounds as described hereinabove, and wherein R' and R" are organic radicals:

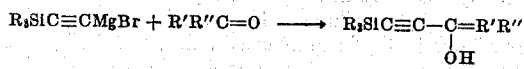
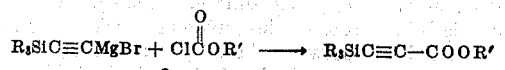
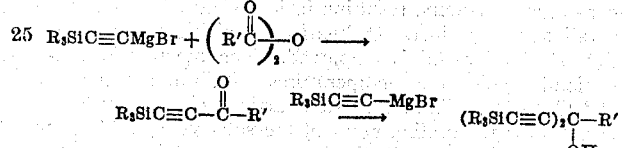
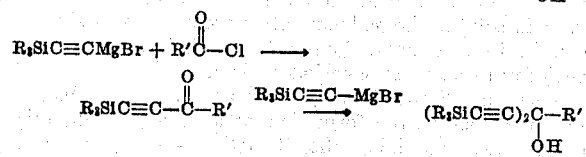
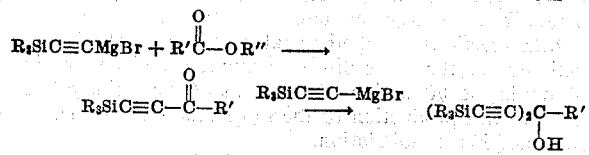
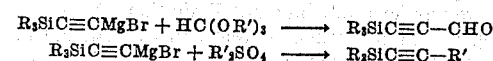
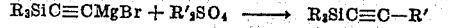
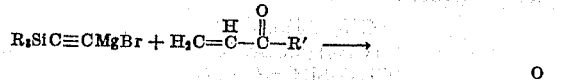
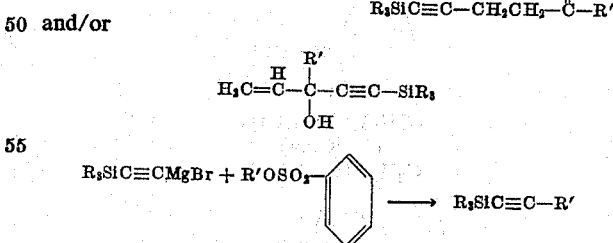

and/or

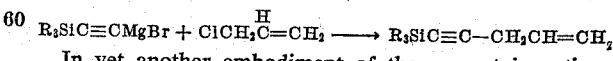

In yet another embodiment of the present invention, each and any of the silyl acetylenes described hereinabove is reacted with an alkali metal, which replaces the active acetylenic hydrogen to give the corresponding alkali metal derivatives. The general reaction is $$R_nSi(C{\equiv}CH)_{4-n} + (4-n)M \longrightarrow R_nSi(C{\equiv}CM)_{4-n} + \frac{(4-n)H_2}{2}$$

wherein R is a hydrocarbon radical, M is an alkali metal, and n is an integer from 0 to 3, inclusive. Of the alkali metals, sodium, potassium, and lithium are preferred. The discussion given hereinabove with respect to the hydrocarbon radicals R is equally applicable here, and R can be alkyl, aryl, alkenyl, alkynyl, cycloaliphatic, etc., as described in more detail hereinabove. Just as with the Grignard reagents already discussed, by reacting the compounds of the general formula $R_nSi(C{\equiv}CH)_{4-n}$ where $n$ is 0, 1, or 2, with less than the stoichiometric quantity of alkali metal, there is formed a mixture of compounds including alkali metal compounds still containing one or more —C≡CH groups in addition to one or more —C≡CM groups. In such instances the ethynyl group (—C≡CH) is a hydrocarbon group and thus is one specific type of R. Accordingly, the compounds of the type described are within the general formula $R_nSi(C{\equiv}CM)_{4-n}$. The compounds usually preferred are the alkali metal derivatives of the monoethynyl silanes corresponding to the formula $R_3Si(C{\equiv}CM)$. In all of these alkali metal derivatives, the lower alkyl and lower aryl groups generally find the most use.

The type of compounds under discussion are most conveniently made by directly reacting metallic alkali metal with the ethynyl silane. The reaction is conveniently carried out in liquid anhydrous ammonia, diethyl ether, toluene, dioxane, or other suitable solvents. The liquid ammonia is less preferred inasmuch as considerable cleavage of the bond between the silicon and the acetylenic carbon atom occurs, resulting in low yield of the desired alkali metal product. Ordinarily a stoichiometric quantity of alkali metal is employed. The reaction is conveniently effected at temperatures within the range of 50° C. to 100° C., and is often carried out at room temperature or the boiling point of the solvent, e.g., 35° for diethyl ether. The alkali metal compound is generally used in solution immediately after preparation. While it can be isolated apart from solvents, it is not stable in such form for any long period of time.

These alkali metal compounds are of great value in that they permit the formation of a variety of organic compounds containing the $R_nSi(C{\equiv}C-)_{4-n}$ radicals. The alkali metal compounds are subject to the usual known reactions of alkali metal acetylides, including reaction with the same list of compounds given hereinabove in the tabulation of reactions of the Grignard reagents, with production of the same reaction products as indicated in said tabulation.

By way of example but not limitation of compounds coming within the scope of this embodiment of the invention, reference is made to:

$(CH_3)_3SiC{\equiv}CNa$
$(CH_3)_3SiC{\equiv}CK$
$(CH_3)_2Si(C{\equiv}CNa)_2$

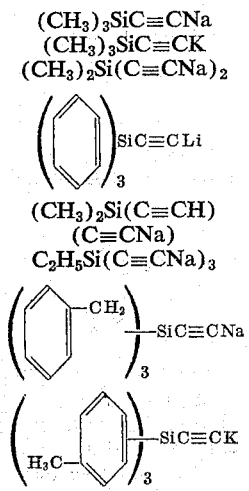

$(CH_3)_2Si(C{\equiv}CH)$
$(C{\equiv}CNa)$
$C_2H_5Si(C{\equiv}CNa)_3$

Yet another embodiment of the present invention provides a new class of chemical compounds selected from the group consisting of silyl propiolic acids having the formula $$R_nSi(C{\equiv}C-COOH)_{4-n}$$

wherein R is a hydrocarbon radical and $n$ is an integer from zero (0) to three (3) inclusive, salts thereof, and esters thereof. The various types of hydrocarbon radicals, and specific hydrocarbon radicals, representative of R are given in the first part of this patent application.

The lower alkyl and lower aryl radicals are preferred R's. One preferred group of compounds are those corresponding to the above formula wherein $n$ is equal to 3, i.e., compounds of the type described containing one propiolic radical. These new chemical compounds, i.e., silyl propiolic acids of the type described, the salts of said acids, and the esters of said acids, exhibit herbicidal activity. They are further useful as intermediates in the synthesis of other chemical compounds, particularly by reactions involving the functional acetylenic group, the functional carboxylic acid group, or the functional ester groups. By way of example can be mentioned the formation of the silyl pyrazolones as described hereinafter, and the formation of the silyl propionic acids and derivatives thereof prepared by hydrogenation. The present silyl propiolic acids, salts, and esters thereof, have general value as biological toxicants and as intermediates in the synthesis of biological toxicants and monomers. Certain metal salts of the propiolic acids are of especial interest as fungicides.

Propiolic acids with which the invention is concerned can be prepared by several routes, with the silyl acetylenes having the formula $R_nSi(C{\equiv}CH)_{4-n}$ as originating materials. The presently preferred procedure is to react a Grignard reagent of the type described hereinabove with carbon dioxide. As a result of such reaction the magnesium salt of the corresponding propiolic acid is obtained, from which the free propiolic acid can be derived by reaction with a mineral acid if desired, or from which magnesium salts other salts can be prepared. While the carbonation reaction between the Grignard reagent and carbon dioxide can be effected in the absence of catalysts, it is much preferred to have present a small but catalytic quantity of a suitable catalyst, for example cuprous chloride.

Several suitable procedures for effecting the carbonation of the Grignard reagent are available. Thus, a reaction flask containing the Grignard reagent can have added thereto a small amount of cuprous chloride and an excess of solid finely divided carbon dioxide, and the mixture stirred until too stiff for further stirring. After standing overnight at atmospheric pressure, with the temperature increasing from that of Dry Ice (solid $CO_2$) to room temperature, the resulting product is worked up to isolate the desired propiolic acid. Alternatively, the Grignard reagent, ordinarily in the form of a suspension and the cuprous chloride, can be placed in a pressure reaction bomb together with excess solid carbon dioxide, preferably in alternate layers. Steel shot is then added for agitation, the bomb closed, and rocked for a suitable reaction period, for example 1 to 2 or more days, during which time the temperature is permitted to rise to room temperature. The resulting reaction mixture is then worked up for isolation of the desired silyl propiolic acid. Still another suitable procedure is to place the Grignard reagent and cuprous chloride in a bomb, add steel shot for agitation, introduce gaseous carbon dioxide into the bomb under pressure, and rock the bomb until no more carbon dioxide is taken up.

The reaction is conveniently effected in the presence of a suitable liquid reaction medium or solvent, e.g., diethyl ether, diethyl Cellosolve (diethyl ether of ethylene glycol), tetrahydrofuran, acetals, and other inert solvents usable in Grignard reactions. A suitable quantity of catalyst is, for example, 5 grams cuprous chloride per mole of Grignard reagent. However, larger or smaller quantities can also be used to advantage.

The reaction goes most rapidly when an excess of carbon dioxide over the stoichiometrically required amount is made available. The reaction goes readily at room temperature. Suitable temperatures will generally be found within the range of Dry Ice temperature to room temperature (20° C.) or higher.

The final reaction mixture is conveniently treated with an aqueous solution of a mineral acid such as hydrochloric acid, sulfuric acid, or the like, resulting in the production of the free silyl propiolic acid as an insoluble solid or liquid. This can then be taken up in a suitable water-immiscible solvent, e.g., ether and if desired recrystallized from a suitable solvent, or distilled, depending on molecular weight.

An alternative method of preparing silyl propiolic acids of the nature described herein is to react carbon dioxide with an alkali metal compound of the class described hereinabove having the general formula

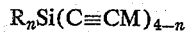

wherein R, M and n have the meanings described heretofore. The procedure and conditions employed are much the same as those just described for carbonation of the Grignard reagent. However, generally poorer yields are obtained from the alkali metal compounds. Any of the solvents described hereinabove as suitable for use in making the alkali metal compound can be used in reacting same with carbon dioxide. However, liquid anhydrous ammonia tends to result in a splitting of the bond between the silicon atom and the acetylene carbon atom, and thus solvents such as diethyl Cellosolve and other ethers are preferred. The methods of contacting carbon dioxide with Grignard reagents described above are likewise applicable for contacting carbon dioxide with the alkali metal compounds. For best results an excess of carbon dioxide over the stoichiometrically required required quantity is used. Conditions of temperature and time are similar to those indicated above for the carbonation of the Grignard reagents; a reaction time of several days may be needed in some cases.

The primary reaction product between the alkali metal silyl acetylene compound and carbon dioxide is the sodium salt of the corresponding silyl propiolic acid. This salt can be employed per se, can be isolated for use or used in the total reaction mixture, can be converted to other salts, or can be converted to the free acid by the same methods described hereinabove with respect to the magnesium salts of silyl propiolic acids obtained from the Grignard reagent. Similarly, the same types of procedures can be used in isolating salts of free acids from the reaction mixture.

Still another procedure for obtaining silyl propiolic acids, salts, and esters thereof, of the class described herein, is by reacting a haloformate with either the Grignard reagents discussed above or the alkali metal compounds discussed above, resulting in the corresponding silyl propiolic acid ester. If the free acid is desired, it is readily obtained by hydrolysis in the persence of an acid or a base in known manner. The general reactions are indicated by the equations:

(a)

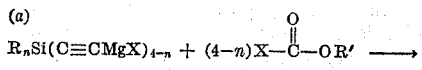

wherein X is halogen and R' is a hydrocarbon radical, it being understood that the X halogen in the two reactants can be the same or different;

(b)

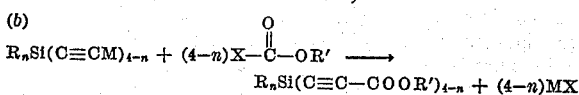

Suitable haloformates, i.e., XCOOR', will be described in further detail hereinafter, as will conditions suitable for the reaction of same with either the Grignard reagent or the alkali metal reagent.

Esters of the silyl propiolic acids of the class described herein can be obtained via haloformates as just described. They can also be obtained by direct esterification of the silyl propiolic acid or the acid chloride of the silyl propiolic acid. Where the haloformate reaction is employed, the haloformate chosen will of course be dependent upon the particular ester desired. Thus, R' in the foregoing general formula for the haloformates can be any hydrocarbon radical, and the various examples of hydrocarbon radicals given hereinabove with respect to R in the silyl acetylenes are also applicable to R'. Esters containing not more than 20 carbon atoms in the esterifying group, i.e., in the alcohol residue or R' are generally most useful. Haloformates containing any of the halogens are suitable. By way of specific examples of suitable haloformates can be mentioned: ethyl chloroformate, isopropyl bromoformate, n-octyl chloroformate, benzyl chloroformate, phenyl chloroformate. The haloformate is reacted with an equimolar quantity of the desired Grignard reagent or alkali metal compound. This is conveniently done in the solvent in which the Grignard or alkali metal compound was prepared, which solvents are discussed hereinbefore. Although catalysts are not necessary, $Cu_2Cl_2$ may be used if desired with the Grignard reagent. The most convenient reaction temperatures are usually between room temperature and the refluxing temperature of the solvent.

Esters of the general formula $R_nSi(C\equiv C-COOR')_{4-n}$ are also obtained by esterifying an alcohol, R'OH, wherein R' has the same meaning as discussed above with respect to the haloformates, with the silyl propiolic acid per se or with the acid chloride of the silyl propiolic acid. Such acid chlorides have the general formula $R_nSi(C\equiv C-COCl)_{4-n}$. Reaction of alcohol with acid chloride is preferred. The acid chloride can be prepared for example by reacting the particular silyl propiolic acid, whose ester is desired, with the thionyl chloride at conditions common for reacting thionyl chloride with carboxylic acids. Esterification is then readily effected by reacting the acid chloride with the chosen hydroxy compound. Suitable temperatures for esterification with the acid chloride will be found within the range of −10° C. to 50° C., for example at about 0° C. Esterification of the silyl propiolic acid per se is usually effected at considerably higher temperatures, for example at the reflux temperature of the alcohol (which is used in excess) or of benzene or toluene added to azeotrope out water formed in the case of high boiling alcohols, and in the presence of an acid catalyst. Still another method of preparing esters of the present invention is by ester exchange reaction in known manner, for example

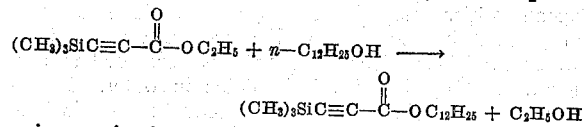

using equimolar amounts of ester and alcohol, a few percent of catalyst ($H_2SO_4$, $NaOC_2H_5$, etc.), the reaction mixture being heated so $C_2H_5OH$ slowly distills out.

The following are mentioned by way of example, but not limitation, of esters coming within the scope of the present invention:

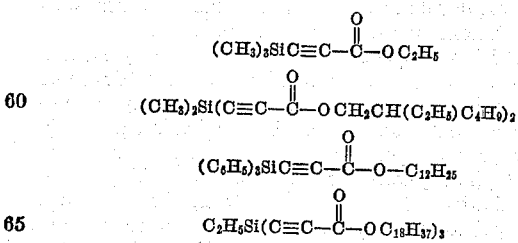

By "salts" of the silyl propiolic acids described herein, is meant not only metal salts thereof but also salts obtained from any base including ammonia and organic bases such as amines and quaternary ammonium hydroxides. In the case of silyl propiolic acids containing more than one propiolic acid group, the monobasic, dibasic, etc. salts are within the scope of the invention. As pointed out hereinabove, magnesium salts are obtainable by carbonation of the Grignard reagents, and alkali metal salts are obtainable by carbonation of the alkali metal derivative of the silyl acetylenes. Other metal salts are readily obtainable by direct reaction of the particular silyl propiolic acid with the desired metal, metal hydroxide, or salt of a metal with a volatile acid, e.g., chlorides, or directly with an organic base for example with trimethylamine, aniline, pyridine, etc. By way of example can be mentioned:

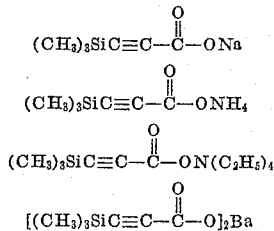

All of the silyl propiolic acids, salts thereof, and esters thereof, as described herein are useful as chemical intermediates and have various uses per se depending upon the particular compound. Thus, for example they find use as biological toxicants. These compounds exhibit herbicidal activity and can by application to living plants cause defoliation and/or killing of the plants. It will be understood of course, that not all of these compounds are the full equivalents of each other in all applications. In most instances the tri(lower alkyl)- and the tri(lower aryl)-silylpropiolic acids, salts, and esters thereof are preferred.

Any of the compounds mentioned in this patent application may be used as herbicides, and this is usually most advantageously effected in admixture with any of the conventional adjuvants and carriers. However, the most convenient form is the oil-in-water emulsion. Thus, herbicidal compositions containing the present compounds are readily obtained by first preparing a solution of the compound in an organic solvent and then adding the resulting solution to water containing an emulsifying agent to form an emulsion. The silyl acetylenic compounds and derivatives thereof as described herein need be used in only very small concentrations, for example in concentrations of 0.1 percent to 2 percent by weight of the total weight of the emulsion. Emulsifying agents which may be employed are those customarily used in the art for the preparation of oil-in-water emulsions. The word "oil" is here used to designate any liquid which is insoluble in water. Examples of emulsifying agents which may be used include alkylbenzene sulfonates, long-chained polyalkylene glycols, long-chained succinates, etc. Examples of organic solvents which may be used in preparing the emulsions include hydrocarbon liquids such as kerosene, hexane, benzene and toluene; fatty oils, nitro compounds such as nitrobenzene or nitrobutane, chloro compounds such as carbon tetrachloride or the chlorobenzenes, ketones, such as cyclohexanone or methyl ethyl ketone, etc.

The emulsions may be used to destroy already-existing plant growth by direct application to the undesirable plants, e.g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily-employed temporary surfacing materials, e.g., oils, cinders, etc.

While most of the present compounds are advantageously employed as herbicides by incorporating them into emulsions as herein described, they may also be employed in other plant-destroying methods. Thus, they may be incorporated into solid carriers, such as clay, talc, pumice, and bentonite to give herbicidal compositions which may be applied to living plants or to surfaces which are to be freed from plant growth. The compounds may also be mixed with liquid or solid agricultural pesticides, e.g., insecticides and fungicides. Solutions of the compounds in organic solvents may be employed for preventing and destroying plant growth, although the emulsions often possess an improved tendency to adhere to the treated surfaces and thus less of the active ingredient is required to give comparable herbicidal efficiency. Some of the compounds described herein, especially the Grignard reagents and the alkali metal silyl acetylides, are not stable to water and therefore are best employed in an anhydrous medium; subsequent contact of the compounds with water during use as a herbicide still results in a product having herbicidal activity. The situation is similar with compounds described herein that are not stable towards oxygen; they are best used in organic solvents and the materials resulting from the contact with the air still retain herbicidal activity. Herbicidal formulations of the emulsion, organic solvent, or solid carrier type usually contain not over 10 weight percent of the active ingredient, and often from 0.1 to 5 weight percent.

Still another aspect of the invention provides pyrazolones derived from each and any of the silyl propiolic acids, and their esters, as described hereinbefore, by reaction with hydrazines of the type R″NHNH$_2$ where R″ is a hydrocarbon radical, preferably a lower aryl radical. The discussion given hereinbefore in the earlier part of this patent application with respect to R applies also to R″. The general reaction is

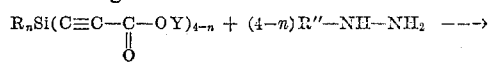

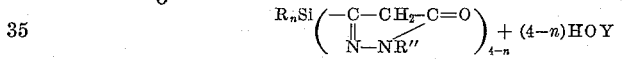

wherein R, R″, and $n$ have the meanings indicated hereinabove, and wherein Y is hydrogen or a hydrocarbon radical, in the respective cases of reaction with the silyl propiolic acids, and esters of the silyl propiolic acids. A readily available hydrazine is phenylhydrazine. By way of example can also be mentioned

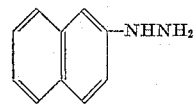

The pyrazolones are readily formed by direct reaction between the silyl propiolic acid or esters of silyl propiolic acid with the hydrazine, as obtained for example by directly mixing the reactants together. However, since the reaction is exothermic, it is often advisable to have present a solvent such as benzene, toluene, hexane, or other inert solvent, and preferably a solvent in which the product is not very soluble in order that the product is readily separated. Ordinarily room temperature is adequate and the reaction proceeds rapidly. However, in some instances it may be desirable to heat the reaction mixture to obtain a more rapid or complete formation of pyrazolone product.

Pyrazolones of the type described herein have herbicidal activity. In many instances they are also more water-soluble than the free acids, for example as in the case of the pyrazolone obtained by reaction between phenylhydrazine and trimethyl silyl propiolic acid, i.e., 1-phenyl-3-trimethylsilyl-5-pyrazolone. Also, the hydrazines are in general less expensive than the silyl propiolic acids and their derivatives, and where the pyrazolones are equally efficacious as a herbicide on a weight basis, the cost of the herbicide is thus reduced.

An additional embodiment of our invention provides a new class of compounds, i.e., acetylenic alcohols containing a silicon atom adjacent to the carbon-carbon triple bond with all other valences of the silicon attached to carbon. These compounds have the general formula

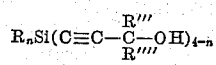

wherein R is a hydrocarbon radical as described in the earlier part of this patent application, and R''' and R'''' are each selected from the group consisting of hydrocarbon radicals and hydrogen. The discussion given hereinbefore with respect to R as to suitable hydrocarbon radicals is also applicable to R''' and R''''. These new silyl acetylenic alcohols are readily prepared by reacting a carbonyl compound having the formula

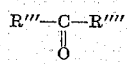

wherein R''' and R'''' are as just defined, with either the Grignard reagents or the alkali metal reagents derived from the silyl acetylenes (i.e., ethynyl silanes) described hereinbefore. Preferred alcohols are those wherein R is a lower alkyl radical or a lower aryl radical, and wherein one or both R''' and R'''' are lower alkyl or lower aryl radicals or hydrogen. By way of example of suitable carbonyl compounds can be mentioned formaldehyde, acetone, n-butyraldehyde, isobutyraldehyde, methyl ethyl ketone, acetophenone. Equivalent to carbonyl compounds wherein R''' and/or R'''' are hydrocarbon radicals consisting of carbon hydrogen are those wherein R''' and/or R'''' are organic radicals containing constituents other than carbon and hydrogen but that are not reactive with the Grignard reagents or with the alkali metal reagents as the case may be. For example, certain sterols containing a keto group undergo the reaction. Groups such as hydroxy, chlorine, primary and secondary amino, carboxyl, etc., are reactive with the Grignard reagents and with the alkali metal reagents; carbonyl compounds containing such groups can be subjected to the reaction with an excess of the Grignard or alkali metal reagent, and to that extent are also equivalents of the corresponding compounds not containing such reactive groups.

The silyl acetylenic alcohols described herein find use as general biological toxicants, particularly as herbicides.

The reaction between carbonyl compounds and the Grignard reagent or the alkali metal reagent is readily effected at temperatures in the neighborhood of room temperature, and is quite fast. The procedure is facilitated by having present sufficient solvent to give adequate mixing of reactants and heat removal. Suitable solvents are of the type described hereinabove as suitable for making or using the Grignard reagents or suitable for making or using the alkali metal reagents, respectively.

The following compounds are mentioned by way of example and not limitation of silyl acetylenic alcohols coming within the scope of the present invention:

3-methyl-1-trimethylsilyl-1-butyn-3-ol [Me₃SiC≡C—CMe₂]
                                                    |
                                                   OH 2,5,5,8-tetramethyl-2,8-dihydroxy-5-sila-3,
        6-nonadiyne [(Me₂C C≡C—)₂SiMe₂]
                       |
                      OH

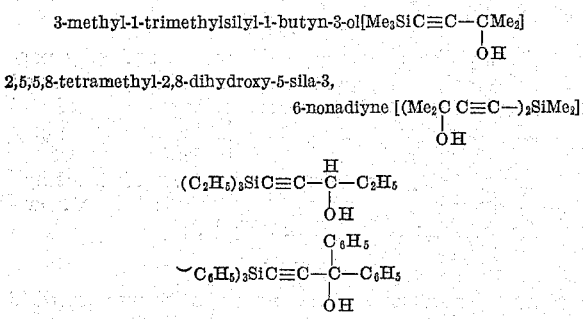

The following examples give details of some reactants, conditions and products suitable for use in the practice of various embodiments of the present invention. It will be understood of course that many variations from the details given in these examples are possible without departing from the invention. In the examples, "percent conversion" is percent of theory, calculated as $$100 \times \frac{\text{mols product}}{\text{mols charged}}$$

Example 1

Sodium acetylide was prepared by passing acetylene through sodium amide in liquid ammonia. The ammonia was replaced with purified N-methylmorpholine. Two moles of chlorotrimethylsilane were added and the mixture was allowed to react at 50–57° C. for 7 hours and at room temperature for 64 hours. The reaction mixture was filtered, washed, and distilled to give an 11.9 percent conversion to the product, ethynyltrimethylsilane, B.P. 51–52.5° C. Details were as follows:

Into a 2-liter, 3-necked flask fitted with a stirrer and gas inlet tube was placed 1.5 liters of liquid ammonia. This was kept cold by maintaining the flask in a bath of Dry Ice (solid $CO_2$)—$CHCl_3$—$CCl_4$. Ferric nitrate in the amount of 0.6 gram was added and the material stirred. Sodium metal in the amount of 49 grams (2.14 moles) was added gradually in small increments. One hour and 45 minutes was required from beginning the addition of sodium before all had been converted to $NaNH_2$, as shown by disappearance of blue color.

Gaseous acetylene was then bubbled into the liquid solution of sodamide in liquid ammonia which was constantly stirred. The solution first became milky, and at the end of 1½ hours became dark again, indicating that the theoretical amount of acetylene had been absorbed, forming a solution of sodium acetylide. The cooling bath was removed and the ammonia allowed to evaporate after the addition of 400 ml. of purified N-methylmorpholine. After considerable stirring, the material was warmed to 50–60° C. and nitrogen bubbled therethrough for several hours to remove the ammonia.

To the stirred solution of sodium acetylide in N-methylmorpholine was added 216 grams (2.0 moles) of chlorotrimethylsilane over a period of 15 minutes. There was some evolution of heat, the flask becoming warm, and evolution of white fumes. The reaction mixture was then stirred for one hour at room temperature, then for 7 hours at 50–57° C. It was then allowed to stir at room temperature for 64 hours.

The reaction mixture was filtered to separate liquid from solids. The separated solid was rinsed with diethyl ether and then placed in a beaker containing ice and water. Enough hydrochloric acid was added to make the solution acidic, more ether was added, and the ethereal layer was separated. The ethereal solutions were then combined with the previously separated organic layer, and the material distilled, ether being collected to 40° C. The fraction boiling from 40 to 70° C. was recovered, diluted with ether, and washed with saturated aqueous ammonium chloride solution, and then dried. Following this the material was distilled into several fractions, all of which gave a copious precipitate on treatment with silver nitrate in 95 percent ethanol. This material was then recombined and redistilled. After taking off a forerun boiling up to 51° C., the following distillate fractions were recovered:

| Boiling Point, °C. | Weight, Grams | $n_D^{25}$ |
|---|---|---|
| 51–52½ | 7.1 | 1.3871 |
| 52½ | 7.8 | 1.3871 |
| 52½ | 8.5 | 1.3871 |

These three fractions of constant boiling point and refractive index weighed a total of 23.4 grams, which is a conversion of 11.9 percent of the theoretical.

The second and third fractions were redistilled, and the middle third taken for infrared adsorption analysis and for carbon, hydrogen, and silicon analyses. Results of the analyses are as follows:

| | Percent Carbon | Percent Hydrogen | Percent Silicon |
|---|---|---|---|
| Calcd. for $C_5H_{10}Si$ | 61.1 | 10.25 | 28.58 |
| Found | 60.11 | 10.02 | 28.14 |
| | 60.70 | 10.20 | 27.98 |

The infrared absorption analysis indicated the following structures present in the molecule, as determined by absorption at the indicated wave lengths.

—C≡CH at 3.0 and 4.9$\mu$
$CH_3$—Si at 7.1 and 8.0$\mu$
Si—C at 11.8 and 13.1$\mu$
Si—O absent The product was ethynyltrimethylsilane.

Example 2

The procedure described in Example 1 was followed, with certain changes. A 5-liter flask was used. Sodium acetylide was prepared from 6.6 moles sodium. A mixture of toluene and ethyl ether was added during evaporation of the ammonia. This in turn was followed by purified diethyl Cellosolve. Most of the toluene was then distilled off with stirring. Chlorotrimethylsilane in the amount of 691 grams (6.4 moles) was added over a period of about one hour, the reaction mixture being maintained at about 50° C. The reaction mixture was then stirred at room temperature overnight. The reaction mixture was distilled without filtration. The distillate up to 110° C. was collected and then redistilled, giving a heart cut boiling at 51–53° C., weighing 414.4 grams, and having a refractive index $n_D^{25}$ of 1.3868. This is a conversion to ethylnyltrimethylsilane of 66.1 percent of theory.

Example 3

A procedure similar to that followed in Exmaples 1 and 2 was used. The ammonia employed in making the sodium acetylide was first replaced by dry benzene, and this in turn by dibutyl Cellosolve. Chlorotrimethylsilane was added and the reaction mixture stirred at 50–60° C. for 22 hours and room temperature for 15 hours. Distillate obtained by distilling the reaction mixture without filtration was allowed to stand over sodium bicarbonate solution to destroy unreacted chlorotrimethylsilane. The organic layer was separated, dried, and distilled to give ethynyltrimethylsilane in a conversion of 32 percent of theory.

Example 4

A solution of 98.3 grams (0.30 mole) chlorotriphenylsilane in 150 ml. of diethyl Cellosolve was added rapidly to a stirred mixture of sodium acetylide (0.3 mole) in 150 ml. of diethyl Cellosolve. This mixture was stirred and heated at 100–110° C. for one hour, and stirred for 2 hours longer without heating. Filtration of the reaction mixture gave a residue of hexaphenyldisiloxane (48 percent conversion). Evaporation of the filtrate almost to dryness yielded a white crystalline material which when recrystallized from benzene-hexane mixture gave 13.3 grams (15.6 percent conversion) of ethynyltriphenylsilane, M.P. 149.5–151.5° C. Further recrystallization gave an analytical sample melting at 151–152° C. Analysis for carbon and hydrogen gave the following results:

| | Percent Carbon | Percent Hydrogen |
|---|---|---|
| Calcd. for $C_{14}H_{16}Si$ | 84.46 | 5.67 |
| Found | 85.11 | 5.87 |

The procedure was repeated, using a reaction time of 24 hours at 95–105° C. The only solid isolatable from the reaction was hexaphenyldisiloxane (in 68 percent conversion). These results indicate that ethynyltriphenylsilane tends to decompose when the reaction conditions become too drastic.

Example 5

Sodium acetylide (from 2.1 moles of sodium) was prepared in liquid ammonia by the procedure given in Example 1. The ammonia was replaced by about 800 ml. of reagent grade pyridine. Then 216 grams (2.0 moles) of chlorotrimethylsilane was added to the stirred reaction mixture at 40–50° C. A cooling bath was applied occasionally to maintain this temperature during the addition period (about 20 minutes) and for a short while thereafter. The reaction mixture was stirred for 3 more hours, and then distilled to give 84.1 grams (42.9 percent conversion) of ethynyltrimethylsilane.

Example 6

This example demonstrates the production of diethynyldimethylsilane, the production of the di-Grignard reagent of diethynyldimethylsilane, and the production of the di-alcohol by reaction of the said Grignard reagent with acetone.

Sodium acetylide (from 1.68 moles of sodium) was prepared in 600 ml. of diethyl Cellosolve by the procedure described in previous examples. Dichlorodimethylsilane (104 grams, 0.80 mole) was added, keeping the temperature below 45° C. with intermittent cooling. The reaction mixture was stirred overnight at room temperature and then distilled to recover as distillate all material boiling below 51° C. at 65 mm. Hg pressure.

A portion of the distillate, containing diethynyldimethylsilane and diethyl Cellosolve solvent whose boiling points are quite close together, was added to ethylmagnesium bromide (from 1.2 moles magnesium) in 400 ml. diethyl ether, and the resultant mixture refluxed for 40 minutes. The product was the Grignard reagent of diethynyldimethylsilane dissolved in a mixture of diethyl ether and diethyl Cellosolve.

This solution of Grignard reagent was treated with 120 ml. of dry acetone. This was added dropwise to maintain a moderate rate of refluxing. The reaction mixture after being heated and stirred for one hour or more was cooled and poured into a mixture of 100 grams of ammonium chloride and 600 grams of ice water. The organic layer was taken up in ether and the aqueous layer was acidified and extracted with ether. The combined organic layers were dried over magnesium sulfate, filtered and distilled to remove the ether and diethyl Cellosolve. The residue solidified upon standing and was recrystallized from a chloroform-hexane mixture. The conversion to white solid, M.P. 107–108° C., was 10.8 grams (5.8 percent of theory based on starting dichlorodimethylsilane). Analytical data (elemental analysis and infrared) confirmed that the structure of this solid was 2,5,5,8-tetramethyl-2,8-dihydroxy-5-sila-3,6-nonadyne.

Example 7

Trimethylsilyl acetylene (0.33 mole) and ethylmagnesium bromide (from 0.33 mole each of magnesium and ethyl bromide) in 200 ml. diethyl ether were stirred and heated under reflux until a white gelatinous precipitate formed. This precipitate is the Grignard reagent of trimethylsilyl acetylene (also properly termed trimethylethynylsilane or preferably ethynyltrimethylsilane), having the formula: $(CH_3)_3SiC≡CMgBr$.

Example 8

The Grignard reagent whose preparation was described in Example 7 was allowed to remain in the ether suspension. 1.5 grams of cuprous chloride was added. The precipitate was stirred vigorously for a few minutes after which 150 ml. of diethyl ether was added. After 15 minutes more of vigorous stirring, the reaction mixture was transferred to a 1-liter bomb and excess solid carbon dioxide (about 400 grams) was added. The bomb was sealed and rocked for 20½ hours at room temperature. The contents of the bomb were then introduced into a mixture of 150 grams ice, 24 grams ammonium chloride, and 35 ml. of concentrated hydrochloric acid. The organic layer was separated. The aqueous layer was extracted once with diethyl ether and the resulting ether extract added to the organic layer. The combined ethereal mixture was washed with water and dried over magnesium sulfate, and then distilled at reduced pressure. Product (20.1 grams) boiling at 95–97° C. at 7 to 8 mm. Hg pressure had a refractive index $n_D^{25}$ of 1.4490, and represented a conversion to trimethylsilylpropiolic acid of 42.4 percent of that theoretically obtainable from the starting trimethylsilyl acetylene. Infrared absorption analysis of this product showed the presence of

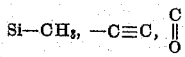

and acid OH groupings in the molecule, which analyzed as follows:

|  | Percent Carbon | Percent Hydrogen | Percent Silicon |
|---|---|---|---|
| Calcd. for $(CH_3)_3SiC\equiv C-COOH$ | 50.67 | 7.09 | 19.74 |
| Found | 50.56 | 6.93 | 19.55 |
|  | 50.82 | 7.21 | 19.75 |

The procedure described above was repeated, using 2.0 moles of the trimethylsilyl acetylene starting material, but modified by placing steel shot in the rocking bomb to break up the Grignard reagent and expose more surface to the carbon dioxide. A 53.3 percent conversion to the trimethylsilylpropiolic acid resulted.

*Example 9*

The procedure of Example 8 was repeated, but without the addition of cuprous chloride. The reaction mixture of bromomagnesium trimethylsilylacetylide, i.e., the Grignard reagent, and carbon dioxide was rocked in a sealed bomb for 43 hours and allowed to stand for an additional 72 hours (115 hours total), before being worked up. A small amount of impure trimethylsilylpropiolic acid was obtained.

*Example 10*

The procedure of Example 8 was slightly modified, resulting in a higher yield. The modification involved sealing the stiff ether suspension of the Grignard reagent from 0.85 mole ethynyltrimethylsilane into a 3-liter bomb in thin alternate layers with 500 grams of solid carbon dioxide. Layers of the latter were at the top and the bottom. The rest of the procedure of Example 8 was followed to give trimethylsilylpropiolic acid in a conversion of 61 percent of theoretical.

*Example 11*

The procedure of Example 8 was repeated except that instead of effecting the carbonation under pressure, the solid carbon dioxide was added directly to the gelatinous precipitate in the reaction flask until the mixture became too solid to be stirred. About 500 grams of carbon dioxide was used. The reaction mixture was allowed to stand overnight and was then worked up as before to give 16.7 grams of trimethylsilylpropiolic acid, which is a conversion of 35.2 percent of theory. This trimethylsilylpropiolic acid was acidic to moist litmus, and very unsaturated to aqueous potassium permanganate resulting in decoloration of the premanganate solution and precipitation of $MnO_2$.

*Example 12*

Sodium trimethylsilylacetylide was prepared in the following manner. Sodium metal in the amount of 8.0 grams was reacted with 300 ml. of liquid anhydrous ammonia, forming sodium amide. Trimethylsilylacetylene (0.33 mole) was then added dropwise and the mixture stirred for one hour. This preparation of sodium trimethylsilylacetylide in liquid ammonia was then used as described in Example 13 below.

*Example 13*

This example shows the preparation of 3-methyl-1-trimethylsilyl-1-butyn-3-ol from sodium trimethylsilylacetylide whose preparation is described in Example 12. Acetone in the amount of 20 grams (0.35 mole) was added dropwise to the liquid ammonia preparation described in Example 12. The mixture was then stirred for one hour. Ammonia was then allowed to evaporate, and ice in the amount of 100 grams was introduced into the reaction flask. The flask was vigorously shaken and the contents poured into a separatory funnel. The flask was rinsed with 300 ml. diethyl ether and the rinsings added to the funnel. The aqueous layer was carefully acidified with 50 percent sulfuric acid, after which the aqueous and inorganic layers were separated. The aqueous layer was extracted three times with separate 20 ml. portions of ether. After washing and drying, the ether extract was distilled, yielding 4.9 grams (8.3 percent of theoretical conversion) of 3-methyl-1-trimethylsilyl-1-butyn-3-ol, B.P. 80–85° C./35 mm.

The low yield indicates that, although the sodium derivative of trimethylsilylacetylene is formed in significant yields by reaction of trimethylsilyl acetylene with sodium amide in liquid ammonia, the yield of the sodium derivative is not nearly so high under these conditions as is the yield of the corresponding Grignard reagent of trimethylsilylacetylene; see Example 14.

*Example 14*

Trimethylsilylacetylene (0.33 mole) and ethylmagnesium bromide (from 0.33 mole each of magnesium and ethyl bromide) in 200 ml. diethyl ether were stirred and heated under reflux until a precipitate formed. Then 0.35 mole of acetone was added dropwise. A vigorous exothermic reaction took place, and the white precipitate became more fluid and dark. After the addition was complete, the reaction mixture was stirred and refluxed for one hour, and then decomposed by pouring into a mixture of 25 grams of ammonium chloride and 200 grams of ice and water. Distillation of the ether layer gave 28.4 grams (54.4 percent conversion) of 3-methyl-1-trimethylsilyl-1-butyn-3-ol, B.P. 81–82° C. at 35 mm., M.P. 41.0–41.8° C. Infra-red absorption analysis showed the presence of the following groups: $SiCH_3$, $C\equiv C$, COH. Analysis for silicon gave 17.81 and 17.27 weight percent silicon in duplicate tests (calculated for $C_8H_{16}SiO$ is 17.96%).

*Example 15*

The Grignard reagent of ethynyltrimethylsilane was prepared, by the procedure described in preceding examples, from 40.0 grams (0.407 mole) of ethynyltrimethylsilane and ethylmagnesium bromide (using 0.50 mole each of magnesium and ethyl bromide) in 400 ml. of diethyl ether and 300 ml. benzene. This Grignard suspension was then added under nitrogen over a 50-minute period to a solution of 59.6 grams (0.55 mole) of ethyl chloroformate and 150 ml. ether. The mixture was stirred and refluxed for 3 hours more. After stirring overnight at room temperature, the mixture decomposed with ice (400 grams) and 50 ml. of concentrated hydrochloric acid. The organic layer was separated, washed successively with water, 10 percent potassium bicarbonate solution, and water and dried. Distillation gave 12.4 grams of ethyl trimethylsilylpropiolate, B.P. 92–96° C. at 28 mm., $n_D^{27}$ 1.4409. Analysis for carbon and hydrogen gave:

|  | Percent Carbon | Percent Hydrogen |
|---|---|---|
| Calcd. for $C_8H_{14}O_2Si$ | 56.43 | 8.29 |
| Found | 56.56 | 8.66 |

Example 16

A solution of 42.7 grams (0.30 mole) of trimethylsilylpropiolic acid in 75 ml. of dry benzene was heated to reflux and stirred while 107.1 grams (0.90 mole) of thionyl chloride (redistilled from sulfur) was added dropwise over 50 minutes. The mixture was stirred and refluxed for one hour more after which the benzene and excess thionyl chloride were removed by distillation under reduced pressure. Then 50 ml. of benzene was added and the distillation under reduced pressure resumed. This procedure was repeated twice more. The residual acid chloride was diluted with 25 ml. of benzene and slowly added with swirling and cooling in an ice-bath to a cold solution of 50 ml. pyridine and 50 ml. (0.82 mole) of absolute ethanol. The brownish mixture was cooled in an ice-bath for two hours more and then allowed to stand at room temperature for 4 days. The reaction mixture was poured into a mixture of 300 ml. of 10 percent hydrochloric acid solution and 100 grams of ice. The organic layer was separated and combined with four 40 ml.-portions of ether used in extracting the aqueous layer. The combined ethereal solution was washed with four 20-ml. portions of 10 percent hydrochloric acid solution, three 20-ml. portions of 10 percent sodium hydroxide solution, one 25-ml. portion of water and dried over anhydrous magnesium sulfate. Distillation gave 23.0 grams (45 percent overall conversion) of ethyl trimethylsilylpropiolate, B.P. 92½–96° C./25 mm.

Example 17

Two grams of the trimethylsilylpropiolic acid whose preparation is described above in Example 8, and four milliliters of phenylhydrazine, were mixed together. A solid formed immediately with evolution of considerable heat. Ten milliliters of benzene was added, the solids were broken up with a stirring rod, and the reaction mixture was heated under reflux for ½ hour. The material was filtered, and the precipitate dissolved in 15 ml. hot ethyl alcohol. On cooling, a colorless solid precipitated. This material was filtered; the filtrate was diluted with hexane, resulting in additional precipitate. The melting point of the first crop was 138–139° C. This material was recrystallized again, giving a product with a melting point at 138.8–139.6° C. Material recrystallized the third time was dried in a vacuum pistol in the presence of $P_2O_5$ and paraffin, and then analyzed for nitrogen, with the following results.

Nitrogen, weight percent
Calculated _____ 12.06
Found _____ 11.34

Example 18

The Mannich reaction between equimolar quantities of ethynyltrimethylsilane, formaldehyde (in the form of trioxymethylene), and diethylamine, was effected in refluxing dioxane (at atmospheric pressure) for 16 hours. The cooled solution was diluted with diethyl ether and extracted with 10% hydrochloric acid. The acid solution was made basic and extracted with ether. Distillation of the ethereal solution gave a product (40% conversion) boiling at 92–95° C./34 mm., which was 1-trimethylsilyl-3-diethylaminopropyne. This gave a hydrochloride, M.P. 119–123.5° C. after three recrystallizations from benzene-ether.

The hydrochloride showed no evidence of any decomposition or other change on standing for a week in the form of a water solution.

Elemental analysis of the hydrochloride gave the following results:

|  | Found | Calcd. for $C_{10}H_{22}SiN$—HCl |
|---|---|---|
| Percent C | 54.38 | 54.39 |
| Percent N | 6.62 | 6.34 |
| Percent H | 10.10 | 10.50 |
| Percent Cl | 16.62 | 16.06 |

Example 19

Spray testing for herbicidal activity was conducted in the following manner with the trimethylsilylpropiolic acid whose preparation is described above in Example No. 8.

A cyclohexanone solution of the trimethylsilylpropiolic acid and an emulsifying agent were added to water, the quantity of solution employed being calculated to give emulsions containing 1.0 percent, 0.3 percent and 0.1 percent, respectively, of the trimethylsilylpropiolic acid, based on the total weight of each emulsion. The quantity of emulsifying agent used was 0.2 percent by weight, based on the total weight of each emulsion. The emulsifying agent comprised a mixture of a polyalkylene glycol derivative and an alkylbenzene sulfonate.

Three-week old corn and bean plants were respectively sprayed with each emulsion, two plants of each variety being sprayed with each emulsion. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any.

Trimethylsilylpropiolic acid showed high herbicidal activity towards corn, and a high selectivity toward corn over bean, i.e., a high selectivity towards narrow-leafed plants. Thus, at the 1.0 percent concentration, the bean plants showed slight injury; at the same concentration, the corn plants were completely dead, with leaves dried. The bean plants sprayed with the 0.3 percent and the 0.1 percent concentration showed no injury. On the other hand, the corn plants sprayed with the 0.3 percent concentration emulsion were severely injured with leaves dried. Corn plants sprayed with the 0.1 percent emulsion showed slight injury.

Example 20

Spray testing for herbicidal activity was carried out in exactly the manner described in the preceding example in order to determine the herbicidal activity of 1-phenyl-3-trimethylsilyl-5-pyrazolone, whose preparation is described in Example 17.

Results were very similar to those obtained with trimethylsilylpropiolic acid, being identical with the 1.0 percent and the 0.3 percent emulsion. However, with the 0.1 percent emulsion, the corn plants showed moderate injury rather than the slight injury exhibited with trimethylsilylpropiolic acid; in other words, the 1-phenyl-3-trimethylsilyl-5-pyrazolone was a more effective herbicide than the trimethylsilylpropiolic acid when tested on corn with a 0.1 percent emulsion.

While the invention has been described herein with particular reference to various preferred embodiments thereof, and examples have been given of suitable proportions and conditions, it will be appreciated that variations from the details given herein can be effected without departing from the invention.

We claim:
1. A method of killing undesired plants which comprises applying thereto a lethal dose of a monomeric silyl acetylene in which three hydrocarbon radicals other than the acetylene radical are attached to the silicon atom, the said hydrocarbon radicals being selected from the group consisting of alkyl radicals of 1 to 6 carbon atoms, phenyl, and alkylphenyl radicals in which alkyl can be up to 4 carbon atoms.

2. A method of killing undesired plants which comprises applying thereto a lethal dose of a herbicidal emulsion comprising 0.1 to 2% by weight of a monomeric silyl acetylene in which three hydrocarbon radicals other than the acetylenic radical are attached to the silicon atom, water, and an emulsifying agent, the said hydrocarbon radicals being selected from the group consisting of alkyl radicals of 1 to 6 carbon atoms, phenyl, and alkylphenyl radicals in which alkyl can be up to 4 carbon atoms.

3. A method of killing undesired plants which comprises applying thereto a lethal dose of a herbicidal emulsion comprising a monomeric silyl acetylene in which three alkyl radicals of 1 to 6 carbon atoms are attached to the silicon atom, water and an emulsifying agent.

References Cited in the file of this patent

UNITED STATES PATENTS

| | | |
|---|---|---|
| 2,386,452 | Fleming | Oct. 9, 1945 |
| 2,551,924 | Boldebuck | May 8, 1951 |
| 2,671,099 | Frisch | Mar. 2, 1954 |
| 2,671,100 | Frisch | Mar. 2, 1954 |
| 2,671,795 | Frisch | Mar. 9, 1954 |
| 2,682,512 | Agre | June 29, 1954 |

OTHER REFERENCES

Vol'nov: "J. Gen. Chemistry, U.S.S.R.," vol. 10 (1940), pages 1600 to 1604.

Rochow: "Chemistry of the Silicones," 2nd ed. (1952), pp. 32–34.

Petrov et al.: (A), in "Chemical Abstracts," vol. 47, col. 12225(h) to 12226(a), 1953 (abstract of 1952 article).

Petrov et al.: (B), in "Chemical Abstracts," vol. 48, columns 13616(g) to 13617(c), 1954 (abstract of 1953 article).